United States Patent [19]

Hollandsworth

[11] 4,343,374
[45] Aug. 10, 1982

[54] MUFFLER MOUNTING STRUCTURE

[75] Inventor: Larry A. Hollandsworth, Bettendorf, Iowa

[73] Assignee: Caterpillar Tractor Co., Peoria, Ill.

[21] Appl. No.: 173,931

[22] PCT Filed: Apr. 17, 1980

[86] PCT No.: PCT/US80/00440
§ 371 Date: Apr. 17, 1980
§ 102(e) Date: Apr. 17, 1980

[30] Foreign Application Priority Data

Sep. 7, 1979 [JP] Japan .......................... 54-123132[U]

[51] Int. Cl.³ .................... B62D 25/00; F01N 7/18; F16L 9/18; F16L 39/00
[52] U.S. Cl. .................................. 180/69 R; 180/89.2; 181/243; 248/56; 285/158
[58] Field of Search ...................... 98/58, 59; 138/113, 138/114; 180/89.2, 69 R; 181/198, 228, 243, 282; 248/56, 57; 285/133 R, 138, 158

[56] References Cited

U.S. PATENT DOCUMENTS

| 1,824,717 | 9/1931 | Harty et al. | 285/138 |
| 2,759,491 | 8/1956 | Everhart | 285/138 X |
| 3,237,716 | 3/1966 | Parsons | 181/243 |
| 3,550,886 | 12/1970 | Cave | 248/56 |
| 4,020,915 | 5/1977 | Darnell et al. | 180/89.2 |
| 4,085,816 | 4/1978 | Amagai et al. | 180/89.2 |

FOREIGN PATENT DOCUMENTS 1399761 7/1975 United Kingdom .................... 98/58

Primary Examiner—L. T. Hix
Assistant Examiner—Thomas H. Tarcza
Attorney, Agent, or Firm—Phillips, Moore, Weissenberger, Lempio & Majestic

[57] ABSTRACT

A stack (14) is attached to extend upwardly from a hood (12) in surrounding relation about a muffler (18). A sleeve structure (28) surrounds and holds the muffler (18). One or more tabs (30, 32, 34) extend generally outwardly from the sleeve structure (28) towards the stack (14). One or more corresponding brackets (36, 38, 40) extend generally inwardly from the stack (14) towards the sleeve structure (28) and generally adjacent and parallel to the tabs (30, 32, 34). The tabs (30, 32, 34) and brackets (36, 38, 40) are removably secured together. The muffler (18) is relatively quickly attachable within the stack (14). The stack (14) serves to direct noise upwardly and to keep people from touching the relatively hot muffler (18).

2 Claims, 4 Drawing Figures

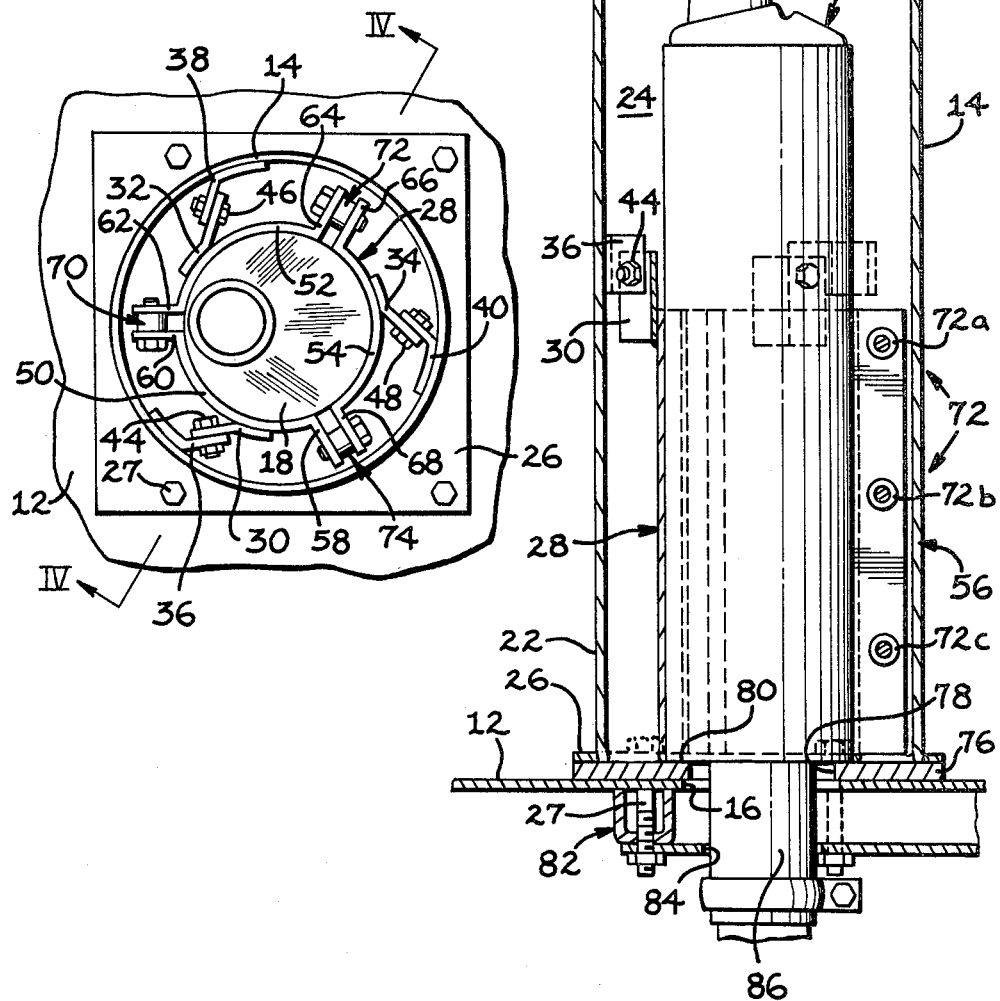

MUFFLER MOUNTING STRUCTURE

DESCRIPTION

1. Technical Field

This invention relates generally to a structure for mounting a muffler and more particularly to a structure for mounting a muffler to extend upwardly from the hood of a vehicle.

2. Background Art

There are certain advantages which result from having a muffler extend upwardly through the hood of a vehicle to well above ground level. Emissions are thereby released above the heads of any persons in the vicinity of the vehicle and have a chance to disperse before settling to the height of a person's head.

Often, mufflers have been mounted to extend upwardly from the hood of a vehicle without any structure being used to surround the muffler. However, in such an instance a relatively non-attractive structure results. Also, it is desirable to provide some type of structure about the muffler so as to direct noise upwardly where it can dissipate and to keep the relatively hot muffler from being touched by a person in its vicinity.

If a structure is to be provided about a muffler which extends upwardly from the hood of a vehicle, it is desirable to have the muffler easily installable within the structure for ease of maintainance and repair.

The present invention is directed to overcoming one or more of the problems as set forth above.

DISCLOSURE OF THE INVENTION

In one aspect of the present invention, an improvement is provided in a structure having a plate including a hole and a member extending generally outwardly through the hole. The improvement comprises a stack having first and second end portions, a cavity extending from the first end portion to the second end portion and a flange extending generally outwardly from the second end portion and being attached to the plate, the stack being in surrounding relation about the member. A sleeve structure surrounds and holds the member and is located within the cavity. A tab is attached to the sleeve structure and extends generally outwardly to adjacent the stack. A bracket is attached to the stack and extends generally inwardly to adjacent the tab. The bracket and the tab are securable to one another.

With an improvement as set out above, a muffler can be quickly installed within the stack and can be readily removed for replacement or repair. Also, the muffler is completely surrounded so as to direct sound upwardly and protect anyone in the vicinity from touching the relatively hot muffler. Further, the stack provides a clean and aesthetically pleasing appearance.

BRIEF DESCRIPTION OF THE DRAWINGS

FIG. 3 illustrates, in partial top view, an improvement in accordance with an embodiment of the present invention; and FIG. 4 illustrates a view taken along the line IV—IV of FIG. 3.

BEST MODE FOR CARRYING OUT THE INVENTION

Figure 1:
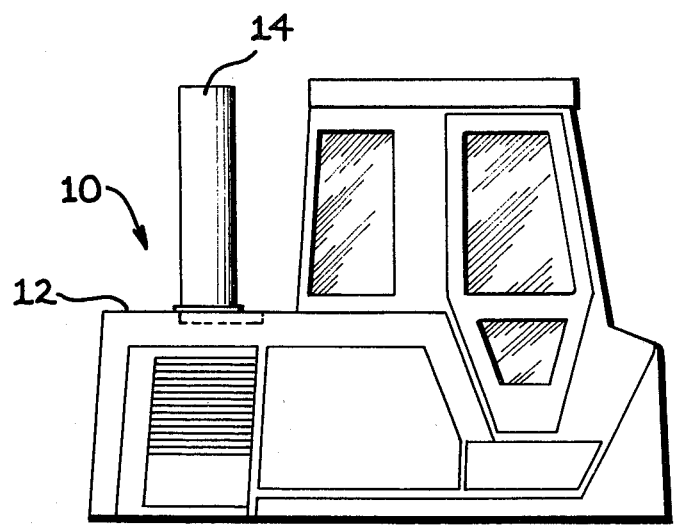
FIG. 1 illustrates, in partial side view, a vehicle having an improvement in accordance with an embodiment of the present invention.
Figure 2:
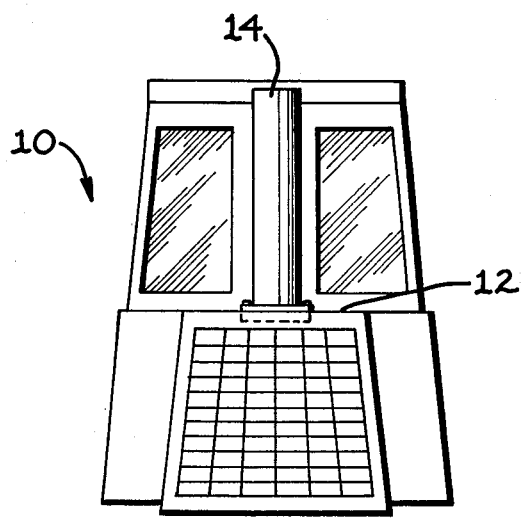
FIG. 2 is a front view of the embodiment illustrated in FIG. 1.

Adverting first to FIGS. 1 and 2, there is illustrated therein a vehicle 10 having a hood 12 from which a tubular stack 14 extends generally upwardly.

The hood 12 (FIGS. 3 and 4) has a hole 16 extending therethrough. A longitudinally extending muffler 18 extends generally upwardly through the hole 16. The stack 14 has a first or upper end portion 20 and a second or lower end portion 22. A cavity 24 extends from the upper end portion 20 to the lower end portion 22. A flange 26 extends generally outwardly from the lower end portion 22 and is attached to the hood 12 via bolts 27. The stack 14 is located in surrounding relation about the muffler 18, with the muffler 18 being positioned in the cavity 24.

A sleeve structure 28 surrounds and holds the muffler 18 and is located within the cavity 24. At least one tab 30, and in the embodiment illustrated a plurality of tabs 30, 32 and 34, are attached to the sleeve structure 28 and extend generally outwardly to adjacent the stack 14.

For cooperation with the tabs 30, 32 and 34, at least one bracket 36, and more generally a plurality of brackets 36, 38 and 40, are attached to the stack 14 and extend generally inwardly within the cavity 24 to adjacent the respective tabs 30, 32 and 34. Means 42, in the embodiment illustrated, a plurality of bolts 44, 46 and 48, serve for removably securing the respective brackets 36, 38 and 40 to the respective tabs 30, 32 and 34.

Nuts may be welded to the brackets 36, 38 and 40 and aligned to receive the bolts 44, 46 and 48. The tabs 30, 32 and 34 and the brackets 36, 38 and 40 are at appropriate angles from the sleeve structure 28 and the stack 14 so as to be positionable in parallel touching relation for insertion of the bolts 44, 46 and 48.

In accordance with the best mode embodiment of the present invention, the sleeve structure 28 includes a plurality of segments 50, 52 and 54 which are generally arcuately shaped to match the external, often cylindrical, shape of the muffler 18 and which extend generally the length of the sleeve structure 28. As will be apparent from FIG. 4, the sleeve structure 28 generally extends at least a significant portion of the length of the muffler 18 so as to provide a steady support therefor.

Means 56 are provided for removably securing adjacent of the segments 50, 52 and 54 together into the sleeve structure 28. In the particular embodiment illustrated, the means 56 includes outwardly extending flanges 58 and 60 on segment 50, 62 and 64 on segment 52 and 66 and 68 on segment 54. Appropriate threaded members such as bolt structures 70, 72 and 74 serve for fastening together adjacent flanges 60 and 62, 64 and 66, and 68 and 58, respectively. The bolt structures 70, 72 and 74, generally include a plurality of bolts and one such structure 72 is illustrated in FIG. 4 as bolts 72a, 72b and 72c.

A base plate 76, seen in FIG. 4, having a central opening 78 which has a periphery 80 which is smaller than the hole 16, may be utilized with the hole 16 and with the periphery 80 extending inwardly over the hole 16. The base plate 76 is generally stiffer and thicker than the hood 12 and is primarily used to provide adequate strength to support the stack 14. The muffler 18 is sized to sit atop the periphery 80. Thus assures proper positioning of the muffler 18 and the sleeve structure 28 for attachment of the tabs 30, 32 and 34 to the brackets 36, 38 and 40.

Generally, the sleeve structure 28 extends downwardly to adjacent the lower end portion 22 of the stack 14 so as to provide adequate bracing for the muffler 18. A bracing member 82 is preferably attached below and generally parallel to the hood 12. The bracing member 82 has an opening 84 through which an end tube 86 of the muffler 18 passes. The bolts 27 are attached against the bracing member 82 to provide needed stiffness and strength.

The muffler 18 can be very readily attached to the inside of the stack 14. The muffler 18 is placed in sleeve structure 28 and rested upon the base plate 76. The segments 50, 52 and 54 are bolted together around the muffler 18. Stack 14 is placed over sleeve structure 28. Thereafter, the tabs 30, 32, and 34 are bolted to the respective brackets 36, 38 and 40. The entire unit is attached to hood 12 by bolts 27. In this manner, the assembler need only position and tighten the bolts 44, 46 and 48 which are relatively easily accessible from the top of the stack 14.

INDUSTRIAL APPLICABILITY

A muffler stack arrangement as set out above is useful with any vehicle wherein it is desirable to have the muffler surrounded for purposes of appearance, to cut down noise, or to keep the relatively warm muffler isolated.

A muffler stack arrangement as set out above provides an aesthetic appearance when utilized with a vehicle, helps to cut down on noise near the ground, and prevents touching of relatively hot muffler parts. Also, assembly is very quick, thus providing for easy installation and easy disassembly for replacement or repair of the muffler 18.

Other aspects, objects and advantages of this invention can be obtained from a study of the drawings, the disclosure and the appended claims.

I claim:

1. In a structure (10) including a plate (12) having a hole (16) and a longitudinally extending member (18) extending generally outwardly through said hole (16), the improvement comprising:

a stack (14) having first (20) and second (22) end portions (20, 22), an internal cavity (24) extending from the first end portion (20) to the second end portion (22) and a flange (26) extending generally outwardly from the first end portion (22) and being in surrounding relation about the member (18) with the member (18) being positioned in the cavity (24);

means (27) for attaching said flange (26) to said plate (22);

a sleeve structure (28) distinct and removable from and surrounding and holding the member (18) and being within the cavity (24), said sleeve structure (28) extending at least a substantial portion of the length of said member (18);

a tab (30) attached to the sleeve structure (28) and extending generally outwardly towards the stack (14);

a bracket (36) attached to the stack (14) and extending generally inwardly towards the sleeve structure (28);

means (42) for removably securing the bracket (36) to the tab (30);

a base plate (76) having a central opening (78) having a periphery (80) which is smaller than said hole (16), said base plate (76) being positioned between said plate (12) and said flange (26) with said opening (78) aligned generally with said hole (16) and said periphery (80) extending inwardly over said hole (16);

said member (18) being sized to sit against said periphery (80); and said sleeve structure (28) extending to adjacent said second end portion (22) and said stack (14).

2. In a vehicle (10) including a hood (12) having a hole (16) and a longitudinally extending member (18) extending generally outwardly through said hole (16), the improvement comprising:

a stack (14) having upper (20) and lower (22) end portions (20, 22), an internal cavity (24) extending from the upper end portion (20) to the lower end portion (22) and a flange (26) extending generally outwardly from the upper end portion (22) and being in surrounding relation about the member (18) with the member (18) being positioned in the cavity (24);

means (27) for attaching said flange to said hood (12);

a sleeve structure (28) distinct and removable from and surrounding and holding the member (18) and being within the cavity (24), said sleeve structure (28) extending at least a substantial portion of the length of said member (18);

a tab (30) attached to the sleeve structure (28) and extending generally outwardly toward the stack (14);

a bracket (36) attached to the stack (14) and extending generally inwardly towards the sleeve structure 28; and means (42) for removably securing the bracket (36) to the tab (30).

* * * * *